United States Patent
Richardson

(10) Patent No.: US 10,073,921 B1
(45) Date of Patent: Sep. 11, 2018

(54) THERMAL AIR DATA (TAD) SYSTEM

(71) Applicant: LOCKHEED MARTIN CORPORATION, Bethesda, MD (US)

(72) Inventor: Nathan R. Richardson, Winter Garden, FL (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 0 days.

(21) Appl. No.: 15/646,054

(22) Filed: Jul. 10, 2017

Related U.S. Application Data

(62) Division of application No. 14/549,665, filed on Nov. 21, 2014, now Pat. No. 9,702,892.

(51) Int. Cl.
- *G06N 5/00* (2006.01)
- *G06F 17/30* (2006.01)
- *G06N 5/02* (2006.01)

(52) U.S. Cl.
CPC ......... *G06F 17/3089* (2013.01); *G06N 5/022* (2013.01)

(58) Field of Classification Search
CPC ... G06F 17/3089; G06N 5/022; G01P 13/025; G01P 5/10
See application file for complete search history.

(56) References Cited

U.S. PATENT DOCUMENTS

| | | | |
|---|---|---|---|
| 5,001,638 A | 3/1991 | Zimmerman | |
| 5,237,867 A | 8/1993 | Cook, Jr. | |
| 5,272,915 A | 12/1993 | Gelbach et al. | |
| 5,299,455 A | 4/1994 | Mangalam | |
| 5,517,862 A | 5/1996 | Berrong et al. | |
| 5,723,784 A | 3/1998 | Lembke et al. | |
| 6,101,429 A | 8/2000 | Sarma et al. | |
| 6,134,958 A | 10/2000 | Djorup | |
| 6,250,149 B1 | 6/2001 | Black | |
| 6,349,596 B1 | 2/2002 | Nakada et al. | |
| 6,393,907 B1 | 5/2002 | Yamakawa et al. | |
| 6,631,638 B2 | 10/2003 | James et al. | |
| 6,672,152 B2 | 1/2004 | Rouse et al. | |
| 6,772,976 B1 | 8/2004 | Rouse et al. | |
| 6,794,981 B2 | 9/2004 | Padmanabhan et al. | |
| 7,624,941 B1 | 12/2009 | Patel et al. | |
| 8,143,689 B2 | 3/2012 | Warsop et al. | |
| 2002/0148289 A1* | 10/2002 | Isogai | G01F 1/6845 73/204.26 |
| 2003/0159505 A1* | 8/2003 | Konzelmann | G01F 1/6845 73/204.26 |

* cited by examiner

*Primary Examiner* — Richard M Camby
(74) *Attorney, Agent, or Firm* — Terry M. Sanks, Esq.; Beusse Wolter Sanks & Maire, PLLC

(57) ABSTRACT

A thermal air data (TAD) sensor comprising a heat dissipating plate including a first surface and a second surface, the heat dissipating plate having a temperature maintained at the constant temperature. The heat dissipating plate is configured to be located at a first location with the first surface flush with an exterior surface of a vehicle. A temperature controller is provided to control the temperature of the heat dissipating plate to maintain the constant temperature during flight of the vehicle and is configured to calculate a value of power to maintain the heat dissipating plate at the constant temperature. An ambient air temperature sensor is to be located at a second location flush with the exterior surface of the vehicle and being paired with the first location.

19 Claims, 12 Drawing Sheets

600

| Local Sensor | $T_{surface}$ | $T_{cal}$ | ΔTemp ($T_{surface}$-$T_{cal}$) | Heat Loss (q) | Conjugate Heat Transfer Coeff ($C_{CHT}$) | Local Velocity ($V_L$) | $V_\infty$ Local |
|---|---|---|---|---|---|---|---|
| $S_1$ | | | | | | | |
| $S_2$ | | | | | | | |
| ... | | | | | | | |
| $S_x$ | | | | | | | |

| MACH# | Conjugate Heat Transfer Coeff ($C_{CHT}$) | $V_L$ |
|---|---|---|
| | | |
| | | |
| ... | | |

FIG. 6C

| Sensor | Δ Temp | Conjugate Heat Transfer Coeff ($C_{CHT}$) | $V_L$ | $V_\infty$ | Angle of Attack ($\alpha$) | Sideslip ($\beta$) |
|---|---|---|---|---|---|---|
| S-1 | | | | | X | X |
| S-2 | | | | | X | X |
| S-3 | | | | | X | X |
| S-4 | | | | | X | X |
| ⋮ | | | | | X | X |
| USS1 | X | X | X | X | | |
| USS2 | X | X | X | X | | |
| UAA1 | X | X | X | X | | |
| UAA2 | X | X | X | X | | |
| Vehicle | X | X | X | | | |

| MACH# | Angle of Attack (α) | Sideslip (β) | $k_z$ |
|---|---|---|---|
|  |  |  |  |

| MACH# | Sideslip (β) | UAA1 Ratio | UAA1 Estimate |
|---|---|---|---|
|  |  |  |  |

| MACH# | Angle of Attack (α) | USS1 Ratio | USS1 Estimate |
|---|---|---|---|
|  |  |  |  |

FIG. 6F

THERMAL AIR DATA (TAD) SYSTEM

CROSS-REFERENCE TO RELATED APPLICATIONS

This application is a Division of U.S. application Ser. No. 14/549,665 filed Nov. 21, 2014, and is incorporated herein by reference in its entirety.

BACKGROUND

Embodiments relate to thermal sensors.

Many flight systems require an accurate estimate of the vehicles airspeed and angle of attack/sideslip to maintain control. These estimates are used in autopilot gain scheduling as well as maintaining coordinated flight of a missile by minimizing sideslip. The most common method of measuring this on an aircraft is to use a pitot probe. The pitot probe is a pressure sensor at the front of the vehicle configured to directly measure the vehicle's airspeed through ram pressure. The pitot probe location may disrupt the low observable (LO) properties of the vehicle and uses prime real estate needed for other seeker sensors. The pitot probe measures airspeed, but does not measure the angle of attack or sideslip which are also used to maintain control of the vehicle. Thus, the angle of attack and sideslip are determined by alternate means. By way of non-limiting example, multiple pitot probes may be used to estimate the angle of attack and sideslip. Multiple pitot probes may have an impact on the aerodynamic performance and LO properties.

Other systems use less accurate inertial methods of aerodynamic flight parameter estimation to determine vehicle airspeed, angle of attack, and sideslip.

SUMMARY

Embodiments relate to a system and vehicle for controlling the flight of a vehicle without the need to use pressure sensors. The system includes a plurality of pairwise thermal air data (TAD) sensors being controlled to have a constant temperature during heat dissipation into the atmosphere by each sensor; and at least one processor configured to measure power for maintaining the constant temperature to calculate an angle of attack, a sideslip and a free stream vehicle velocity at infinity to control flight of a vehicle.

In another embodiment, a vehicle comprising a body having an exterior surface and a longitudinal axis is provided. The vehicle includes a plurality of pairwise thermal air data (TAD) sensors coupled circumferentially around the vehicle body in parallel with the longitudinal axis and being controlled to have a constant temperature during heat dissipation. The vehicle includes at least one processor configured to measure power for maintaining the constant temperature to calculate an angle of attack, a sideslip and a free-stream vehicle velocity at infinity to control flight of the vehicle.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which:

FIG. 6A illustrates a look up table (LUT) for a single sensor;

FIG. 6B illustrates a overall vehicle LUT;

FIG. 6C illustrates a calibration LUT correlating MACH # with the conjugate heat transfer coefficient ($C_{CHT}$) and the local air velocity ($V_L$);

FIG. 6D illustrates a calibration LUT correlating the MACH # with the angle of attack ($\alpha$), sideslip ($\beta$) and the velocity ratio $K_Z$;

FIG. 6E illustrates a calibration LUT correlating the MACH# with sideslip ($\beta$) for calibrating the USS1 ratio;

FIG. 6F illustrates a calibration LUT correlating the MACH# with angle of attack ($\alpha$) for calibrating the UAA1 ratio;

DETAILED DESCRIPTION

Figure 1:
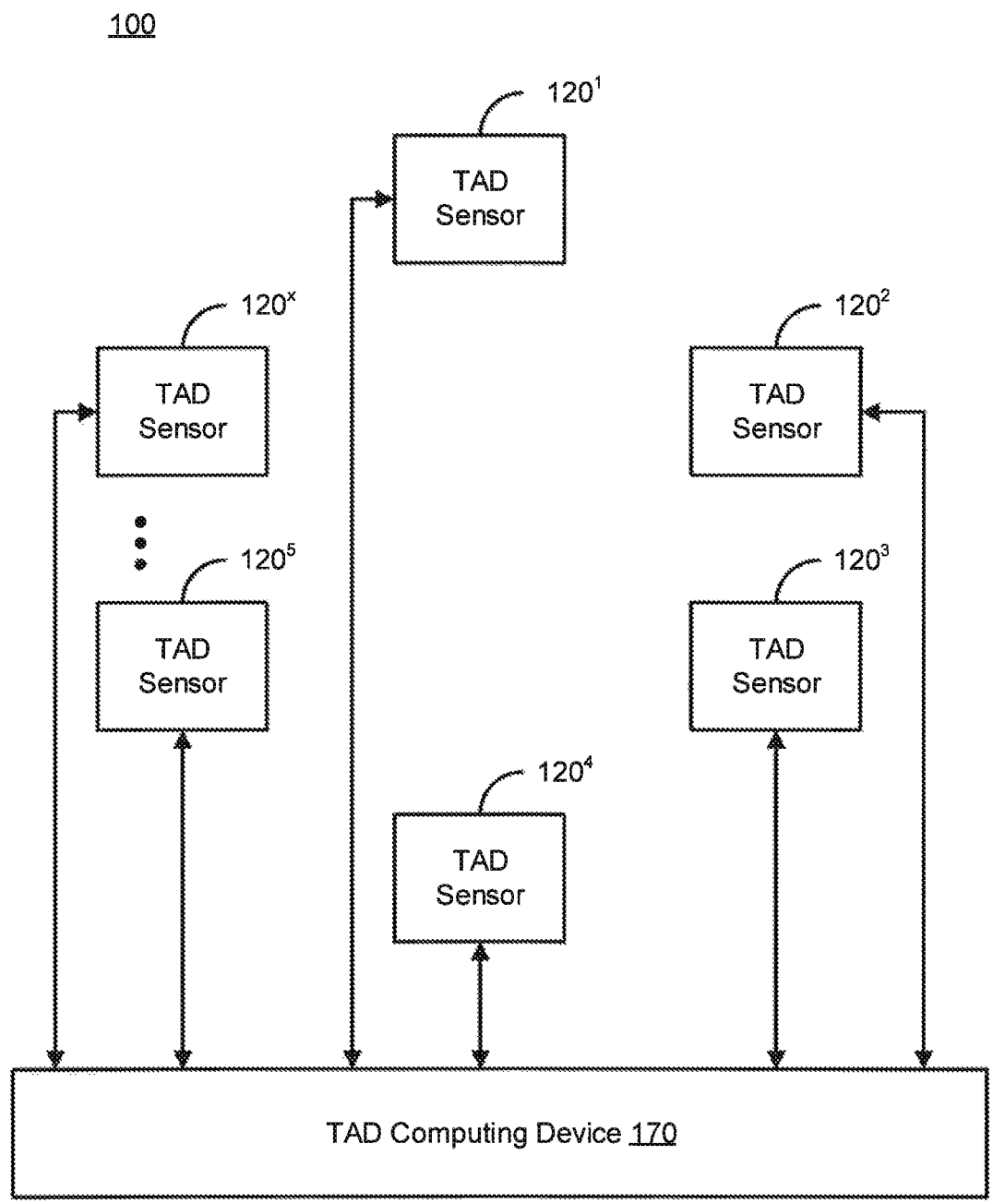
FIG. 1 illustrates a block diagram of a thermal air data (TAD) system.

Embodiments are described herein with reference to the attached figures wherein like reference numerals are used throughout the figures to designate similar or equivalent elements. The figures are not drawn to scale and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

FIG. 1 illustrates a block diagram of a thermal air data (TAD) system. The TAD system 100 may comprise a plurality of pairwise thermal air data (TAD) sensors $120^1$, $120^2$, $120^3$, $120^4$, $120^5$, ... $120^X$ coupled to a computing device 170, wherein the TAD system 100 determines the angle of attack ($\alpha$), the slide slip ($\beta$) and overall vehicle air speed ($V_\infty$) to control the flight of a vehicle. In an embodiment, the overall vehicle air speed ($V_\infty$) may be an overall free-stream velocity at infinity. While five (5) or more sensor are shown, any number of sensors greater than 1 may be used. The parameter X is any number greater than 1 and represents the total number of sensors. At least some of the TAD sensors $120^1$, $120^2$, $120^3$, $120^4$, $120^5$ ... $120^X$ are adapted to be arranged circumferentially around and parallel to the longitudinal axis of the vehicle.

Figure 2:
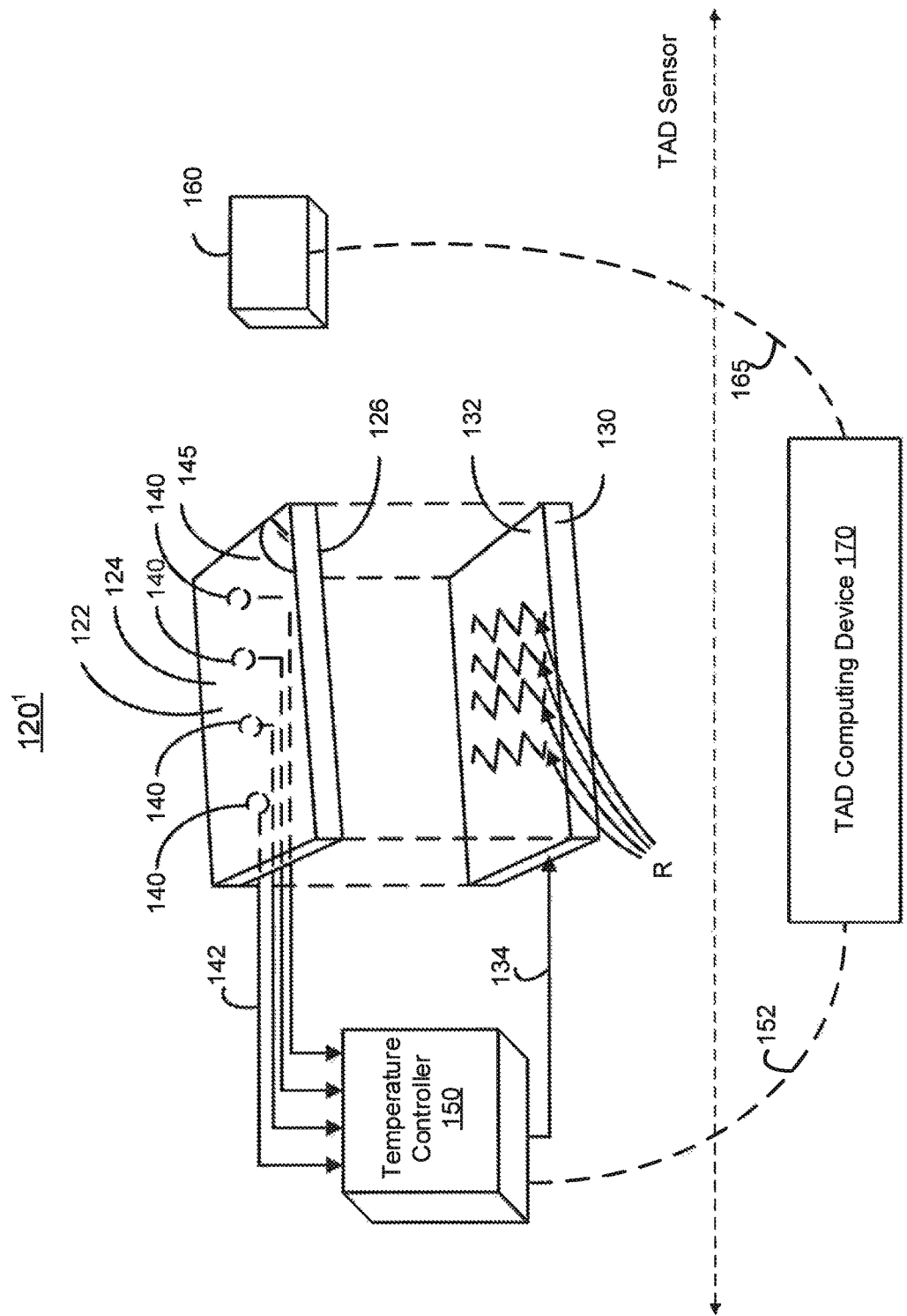
FIG. 2 illustrates a schematic diagram of a pairwise TAD sensor.
Figure 3:
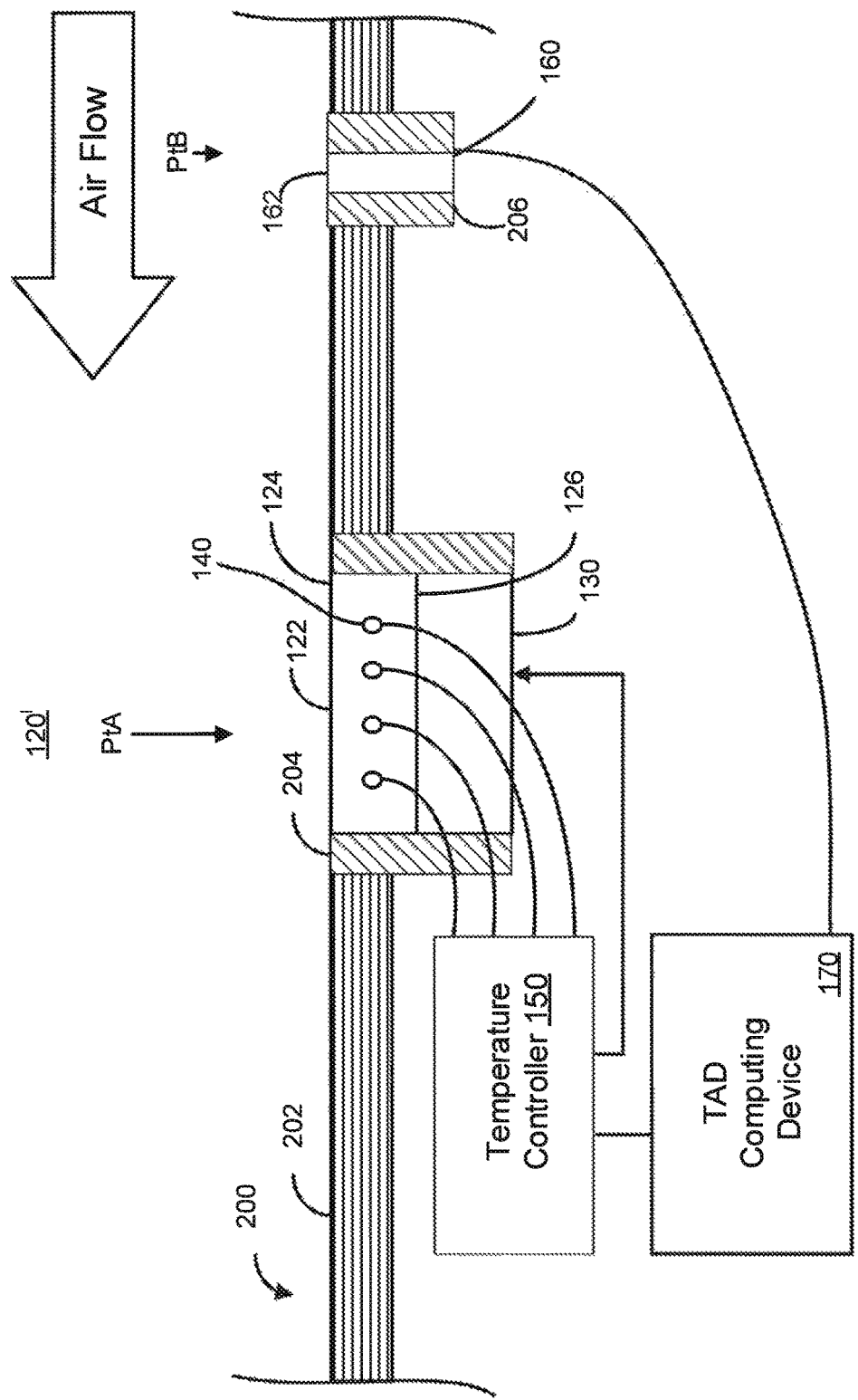
FIG. 3 illustrates the pairwise TAD sensor installed on a vehicle.

FIG. 2 illustrates a schematic diagram of pairwise TAD sensor $120^1$. Since each pairwise TAD sensor $120^1$, $120^2$, $120^3$, $120^4$, $120^5$ ... $120^X$ is essentially the same, only one such TAD sensor $120^1$ will be described in detail. FIG. 2 has a dashed dividing line where above the line is TAD sensor $120^1$ and below the line is the TAD computing device 170. Referring also to FIG. 3, the pairwise TAD sensor $120^1$ installed on a vehicle 200 is illustrated. The TAD system 100 may be configured to be universally adaptable to a variety of vehicle body configurations as will be described in more detail herein in relation to FIGS. 7A, 8, 9 and 10. Moreover, the TAD system 100 may be configured to have low observability (LO) properties.

Referring now to FIGS. 2 and 3, the TAD sensor $120^1$ may comprise a heat dissipating plate 122 configured to be mounted to a vehicle body 202 of vehicle 200 at point A (PtA) where PtA is a first location. In an embodiment, the heat dissipating plate 122 may have a high thermal conductivity (k). The heat dissipating plate 122 may be configured to be mounted flush with an exterior surface of the vehicle body 202 such that an area of a first surface 124 may be exposed to the ambient (exterior) airflow. The flush mounting may reduce drag.

In one or more embodiments, the first surface 124 may be coated with a coating 145 that may allow the heat dissipating plate 122 to have low observability (LO) properties. A portion of the coating 145 is shown removed, thus showing the plate 122 under the coating 145. The heat dissipating plate 122 may include a second surface 126 opposite the first surface 124. The second surface 126 may be located within the vehicle body 202 or located such that the second surface 126 does not have direct exposure to the ambient (exterior) airflow.

Referring also to FIG. 3, the heat dissipating plate 122 may be insulated by insulation 204 from the vehicle body 202. The insulation 204 may minimize any cooling effects through conduction. The first surface 124 has a length which is configured to be parallel with the longitudinal axis of the vehicle, as will be described in more detail in relation to FIGS. 7A and 7B. The first surface 124 is configured to be generally linear or flat in shape. By way of non-limiting example, the first surface 124 may be smooth so that it has low drag properties. In an embodiment, the heat dissipating plate 122 is an elongated strip of material. The elongated side of the strip of material being mounted parallel to the longitudinal axis of the vehicle 200.

The TAD sensor $120^1$ may comprise a heater 130. The heater 130 may be coupled to the heat dissipating plate 122 and may comprise a contact transfer area 132. The heater 130 may be in thermal communication with the second surface 126 through the contact transfer area 132. In an embodiment, the heater 130 may comprise a resistive heater having a plurality of resistive elements R distributed throughout the contract transfer area 132.

The TAD sensor $120^1$ may include at least one temperature sensor 140 coupled to temperature controller 150. The at least one temperature sensor 140 may be configured to sense the temperature of the heat dissipating plate 122 and communicate the sensed temperature to the temperature controller 150 on at least one line 142. The temperature controller 150 may be configured to determine the temperature of the heat dissipating plate 122 based on the sensed temperature by the at least one temperature sensor 140.

In an embodiment, the at least one temperature sensor 140 may comprise a plurality of temperature sensors 140. The plurality of temperature sensors 140 may be distributed throughout the area of the heat dissipating plate 122. The at least one temperature sensor 140 may be insulated from heater 130.

In an embodiment, if a plurality of temperature sensors 140 are used, an average temperature may be determined for the area of the first surface 124. In an embodiment, the temperature controller 150 may determine the temperature of the heat dissipating plate at a center point of the area designated as point A (PtA).

The temperature controller 150 may be configured to control an amount of heat created by the heater 130 to maintain the temperature of the heat dissipating plate 122 at a constant temperature (CT). The temperature controller 150 controls heater 130 via at least one control line 134. By way of non-limiting example, the heater 130 may be configured to increase an amount of heat produced thereby. The heat produced by the heater unit 130 may be transferred by surface-to-surface contact by the heater 130 and the heat dissipating plate 122. The temperature controller 150 may be configured to determine an amount of power to maintain the heat dissipating plate 122 at the constant temperature (CT).

The heat dissipating plate 122 may include a low thermal inertia plate. In an embodiment, the heat dissipating plate 122 may be solid. In another embodiment, the heat dissipating plate 122 may have a non-solid profile with a heat transfer agent. In one or more embodiments, the heat dissipating plate 122 may comprise aluminum (Al), copper (Cu) or other material with a high thermal conductivity. The thermal conductivity may be a function of the environment the vehicle is to be operated. Thermal conductivity (k) may be expressed as Btu/(hr. ° F. ft.). By way of non-limiting example, the minimum thermal conductivity (k) may be at least 24 Btu/(hr. ° F. ft.) or above wherein hr. is hours; ft., is feet; ° F. represents degrees in Fahrenheit; and Btu represents British thermal unit. The low thermal inertia property may maximize the response time for the TAD system 100. In an embodiment, the material and construction of the heat dissipating plate 122 with or without the coating 145 may be selected so that the constant temperature (CT), is nearly the same across the area of plate 122.

The pairwise TAD sensor $120^1$ may comprise a temperature sensor 160 configured to be mounted to the vehicle body 202 at point B (PtB) where the location of point A (PtA) is upstream the location of point B (PtB) on the vehicle body. Upstream is referenced with respect to the nose of the vehicle. As a frame of reference beginning with the nose, point B (PtB) is positioned prior to point A (PtA). In an embodiment, the temperature sensor 160 may be mounted flush with the exterior surface of the vehicle body 202 such that the sensing surface 162 is exposed to the ambient (exterior) airflow exterior to the vehicle body 202. The temperature sensor 160 may be configured to measure the airflow temperature at point B (PtB) in relation to the vehicle body 202. The temperature sensor 160 may be insulated from the vehicle body 202 by an insulation 206. The local air velocity at point A (PtA) is a function of the pairwise difference in temperature between point A and point B and relies on the dissipated heat at point A to be transferred to the ambient air.

The temperature sensing surface 162 may be configured to be mounted adjacent to and aligned with the heat dissipating plate 122. The first surface 124 of the heat dissipating plate 122 and the sensing surface 162 may be constructed and arranged to prevent icing during flight of the surfaces. By way of non-limiting example, the temperature sensing surface 162 may be flat or smooth.

The temperature sensor 160 may communicate with the TAD computing device 170 via line 165. The temperature controller 150 may communicate with the TAD computing device 170 via line 152.

Figure 4:
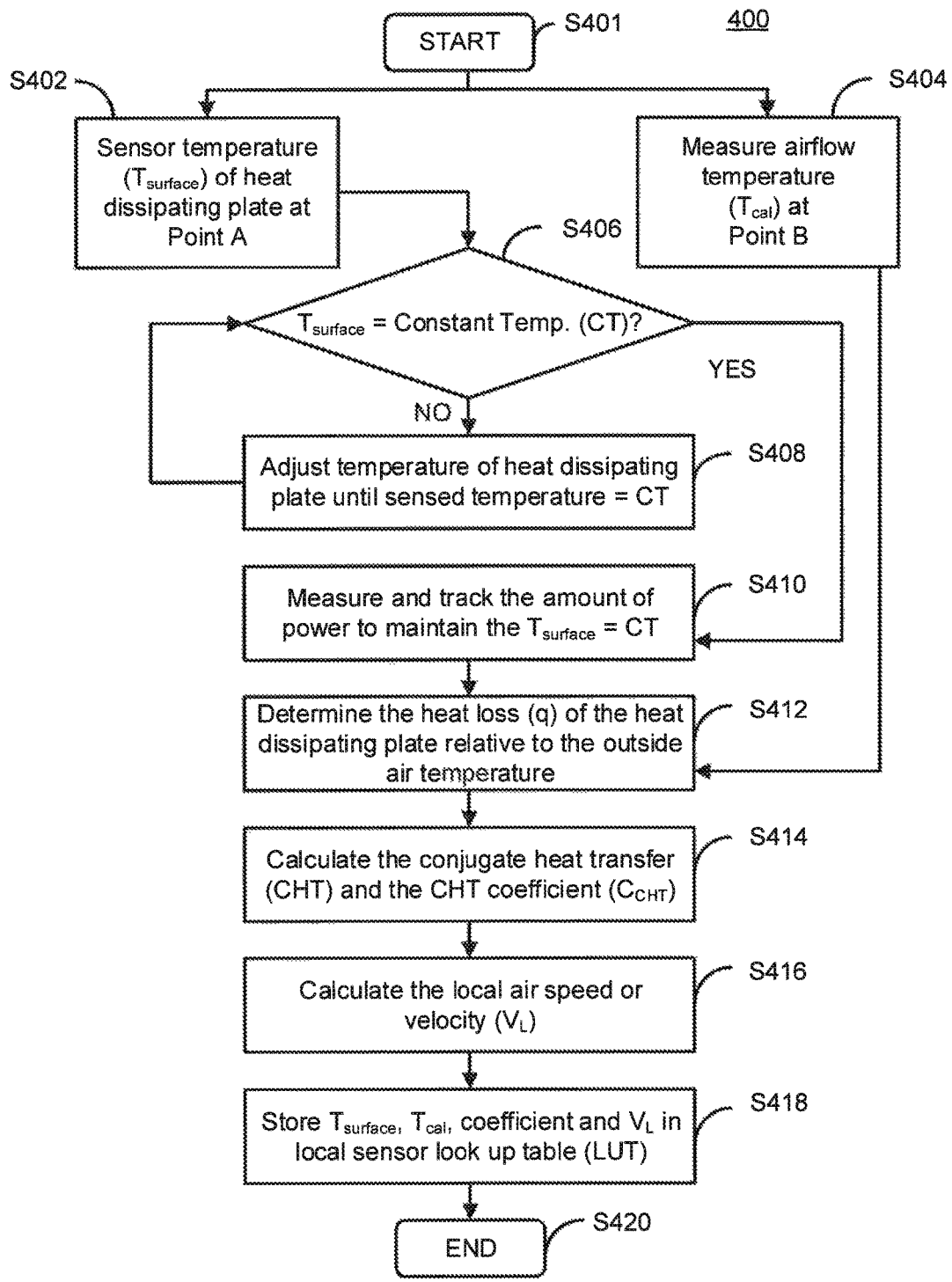
FIG. 4 illustrates a flowchart of the operation of each TAD sensor.

FIG. 4 illustrates a flowchart of the process 400 of the operation of each TAD sensor for calculating at least one of a local vehicle airspeed, the angle of attack ($\alpha$) and sideslip ($\beta$) using the pairwise TAD sensor. The process 400 will be described in relation to FIGS. 2 and 3. The blocks of the process 400 may be performed in the order shown or a different order. One or more of the blocks may be performed contemporaneously. Furthermore, one or more of the blocks may be omitted or combined.

The process 400 may begin with block S401. At block S402, a surface temperature ($T_{surface}$) of the heat dissipating plate 122 may be sensed at point A (PtA) by a TAD sensor $120^1$. The surface temperature ($T_{surface}$) may be measured so that the temperature of the first surface 124 may be known. At block S404, the process 400 may include measuring an airflow temperature by the TAD sensor $120^1$ at point B (PtB) by temperature sensor 160. The temperature sensed at point B (PtB) may be a calibration temperature ($T_{cal}$). In an embodiment, blocks S402 and S404 may be performed contemporaneously.

At block S406, the process 400 may determine if the sensed surface temperature ($T_{surface}$) at point A is substantially equal to a constant temperature (CT). If the determination is "YES," block S406 may proceed to block S410. If the determination is "NO," block S406 may be followed by block S408 where the temperature of the heat dissipating plate 122 at point A is adjusted. Block S408 may loop back to block S406 to determine whether the sensed surface temperature ($T_{surface}$) at point A is substantially equal to the constant temperature CT. The TAD sensor $120^1$ may be configured to maintain the surface temperature ($T_{surface}$) of the heat dissipating plate 122 at the constant temperature (CT).

At block S410, the amount of power to maintain the temperature of the heat dissipating plate 122 substantially equal the constant temperature CT may be measured and tracked. The power may be the amount of energy used over a period of time. For example, the temperature controller 150 may track the amount of energy (E) being used for a predetermined amount of time (t) to determine the power (P). Power (P) can be expressed as P=E/t where P is in watts, E is in joules and t is in seconds. However, other units of time may be used such as hours. Alternately, energy may be calculated in units of Btu. The power may be determined by at least one of the temperature controller 150 or by the TAD computing device 170.

At block S412, the heat loss (q) of the heat dissipating plate at point A (PtA) relative to the temperature at point B may be determined. The heat loss (q) is the power based on the heat dissipation of the heat dissipating plate 122 at point A.

At block S414, the conjugate heat transfer (CHT) and the CHT coefficient may be determined. In an embodiment, the CHT may be determined based on the heat loss (q). The CHT Coefficient ($C_{CHT}$) is based on the heat loss (q) where $C_{CHT}=q/(T_{surface}-T_{cal})$ where $T_{surface}$ is the surface temperature of the heat dissipating plate 122; $T_{cal}$ is the temperature of the sensing surface 162 at point B of the airflow. In an embodiment, the heat loss (q) is the power to maintain the $T_{surface}$ substantially equal to the constant temperature CT. At block S416, the local air speed or velocity ($V_L$) above the heat dissipating plate 122 may be determined.

Prior to flight testing of the vehicle, a calibration look up table (LUT) (FIGS. 6C, 6D, 6E and 6F) may be generated to develop a table correlating the $C_{CHT}$ with the local air velocity or velocity ($V_L$). Each of the TAD sensors $120^1$, $120^2$, $120^3$, $120^4$, $120^5$ . . . $120^X$ may have a separate sensor LUT 650 FIG. 6C. LUT 650 includes columns for the local velocity $V_L$ correlated to the conjugate heat transfer coefficient ($C_{CHT}$) as a function of one or more MACH numbers for each sensor. Using these tables, a local velocity ($V_L$) may be calculated at each sensor during flight.

At block S418, pairwise thermal air data (TAD) sensors $120^1$ the values for $T_{cal}$, $T_{surface}$, heat loss (q), CHT coefficient ($C_{CHT}$), and the local velocity $V_L$ may be stored in look up table (LUT) 600 (FIG. 6A). The process ends at block S420.

The process 400 is performed by each of the plurality of pairwise thermal air data (TAD) sensors $120^1$, $120^2$, $120^3$, $120^4$, $120^5$, . . . $120^X$ and the values for $T_{cal}$, $T_{surface}$, q, CHT coefficient ($C_{CHT}$), and the local velocity $V_L$ may be determined and stored in look up table (LUT) 600 (FIG. 6A) for each corresponding local sensor (TAD sensor). The process 400 may be repeated at least once or continuously during a flight of the vehicle 200 so that the flight or vehicle schedule may be modified according to the flight aerodynamics. The CHT coefficient ($C_{CHT}$), the local velocity ($V_L$) may be determined by the TAD computing device 170.

Figure 5:
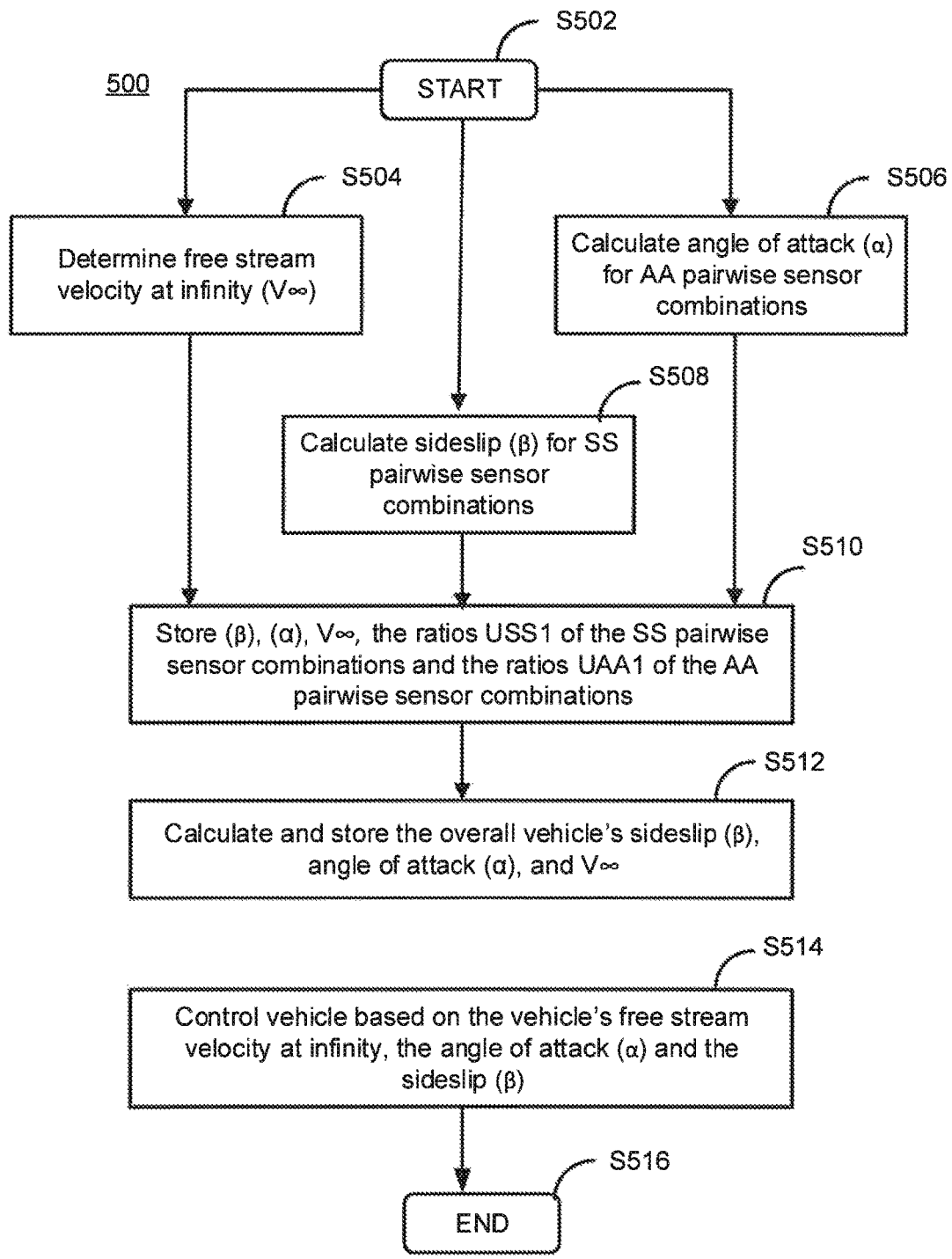
FIG. 5 illustrates a flow chart for a process for controlling the vehicle during flight.

Referring now to FIG. 5, a flow chart of the process 500 for controlling the vehicle 200 during flight is shown. The process 500 may begin at block S502. At block S504, where the process 500 may determine the free-stream velocity at infinity ($V_\infty$). The local free-stream velocity at infinity ($V_\infty$) is shown entered in LUT 600. However, it may be entered in LUT 630 for the overall vehicle. The local free-stream velocity at infinity ($V_\infty$) for each local sensor is calculated as $V_\infty=K_Z*V_L$ where $K_Z$ may be the velocity ratio in calibration LUT 660 generated prior to flight (FIG. 6D). Each sensor may have a different k value, the subscript parameter Z represents the number associated with the particular sensor. The calibration LUT in FIG. 6D may be a function of MACH#, angle of attack ($\alpha$), and sideslip ($\beta$) for each sensor. By way of non-limiting example, the MACH# from calibration LUT 650 (FIG. 6C) can be used to determined $K_Z$ in calibration LUT 660.

At block S506, the process 500 may determine the angle of attack ($\alpha$) of the vehicle 200. The angle of attack ($\alpha$) may be determined using pairwise combinations of the TAD sensor $120^1$, $120^2$, $120^3$, $120^4$, $120^5$, . . . $120^X$ combinations (herein referred to as "AA pairwise sensor combinations") specifically for calculating the angle of attack ($\alpha$). The AA pairwise sensor combinations may be chosen such that the surface normal are in different (opposite) directions in the pitch plane of the vehicle. In an embodiment, at least one ratio UAA1 is determined for the AA pairwise sensor combinations. In LUT 630, columns for UAA1 and UAA2 are shown. However, any number of ratios may be determined based on the number of TAD sensors employed.

By way of non-limiting example, a surface normal at a first sensor of the AA pairwise sensor combination may be pointed in an up (North) direction while the surface normal of the AA pairwise sensor combination may be pointed down (South). Alternately, the surface normal at a first sensor of the SS pairwise sensor combination may be pointed in the East direction while the surface normal of the SS pairwise sensor combination may be pointed in the West direction. How to calculate UAA1, UAA2, USS1 and USS2 will be described in more detail below in relation to FIG. 8.

At block S508, the process 500 may determine the sideslip ($\beta$) of the vehicle 200. The sideslip ($\beta$) may be determined using pairwise combinations of the TAD sensors $120^1$, $120^2$, $120^3$, $120^4$, $120^5$ ... $120^X$ combinations (herein referred to as "SS pairwise sensor combinations") specifically for calculating the sideslip ($\beta$). In an embodiment, at least one ratio USS1 of SS pairwise sensor combinations is determined. In the embodiment, columns for USS1 and USS2 are shown. However, any number of ratios may be determined.

At block S510, the sideslip ($\beta$), angle of attack ($\alpha$), the ratio values USS1, USS2 for the SS pairwise sensor combinations and ratio values UAA1, UAA2 for the AA pairwise sensor combinations are stored in the overall vehicle LUT 630.

The ratio UAA1 may be defined as $V_{LA1}/V_{LA2}$ wherein $V_{LA1}$ is the local velocity for a first sensor of the AA pairwise sensor combinations and $V_{LA2}$ is the local velocity for the second sensor of the AA pairwise sensor combinations. The ratio UAA2 uses a different set of sensors. However, a different set of AA pairwise sensor combinations may have one common sensor or two different sensors. While, the embodiment herein used UAA1 and UAA2, one or more ratios of the local velocities for the AA pairwise sensor combinations may be calculated and stored. The ratio UAA1 is the angle of attack ($\alpha$).

The ratio USS1 may be defined as $V_{LS1}/V_{LS2}$ wherein $V_{LS1}$ is the local velocity for a first sensor of the SS pairwise sensor combinations and $V_{LS2}$ is the local velocity for the second sensor of the SS pairwise sensor combinations. The ratio USS2 uses a different set of sensors. However, a different set of SS pairwise sensor combinations may have one common sensor or two different sensors. The ratio USS1 is the sideslip ($\beta$). While, the embodiments herein used USS1 and USS2, one or more ratios of the local velocities for the SS pairwise sensor combinations may be calculated and stored.

At block S512, the overall vehicle's sideslip ($\beta$) angle of attack ($\alpha$) and overall free-stream velocity at infinity $V_\infty$ is calculated, as described below in relation to FIG. 6B, and stored.

At block S514, the vehicle may be controlled based on at least one of the overall vehicle's values for sideslip ($\beta$), angle of attack ($\alpha$), and free-stream velocity at infinity $V_\infty$. By placing several of the TAD sensors around the vehicle 200, the system 100 is configured to calibrate the combined results to determine the free-stream velocity at infinity $V_\infty$ of the vehicle, the angle of attack, and sideslip. The process may end at block S516.

Using a series of the TAD sensors and s calibration LUTs 670 and 680 such as those shown in FIGS. 6E and 6F, the TAD computing device 170 can calculate the angle of attack ($\alpha$) and sideslip ($\beta$) based on each sensor combination. The LUT in FIG. 6E may contain the relationship between the local velocity ratio UAA1 for the vehicle angle of attack ($\alpha$) and the MACH# and sideslip ($\beta$). The LUT 680 in FIG. 6F may contain the relationship between the local velocity ratio USS1 for the vehicle sideslip ($\beta$) and the MACH#, and angle of attack ($\alpha$). The individual estimates UAA1 or USS1 may be combined by way of averaging or other filtering technique to increase accuracy.

The system 100 may be less sensitive to foreign objects and debris as there are no small tubes to worry about being blocked. Furthermore, the system 100 may be used for in-flight autopilot gain scheduling and long range coordinated flight.

Referring now to FIG. 6A, the look up table (LUT) 600 for determining a local air speed at each designated location referenced by point A may be determined. The LUT comprises one or more columns for $T_{surface}$, $T_{cal}$, delta ($\Delta$) temp, heat loss (q), CHT coefficient ($C_{CHT}$), local velocity $V_L$ and the free-stream velocity at infinity $V_\infty$ (Local). As can be appreciated, one or more of the columns may be placed in a different order shown or omitted. Additionally, the values in LUT 600 may be stored in a plurality of LUTs or storage locations. The LUTs described herein are all stored in memory.

Referring now to FIG. 6B, the LUT 650 includes one or more columns for delta ($\Delta$) temp, conjugate heat transfer coefficient ($C_{CHT}$), a local velocity ($V_L$), a local free-stream velocity, local velocity ratios USS1 and USS2 for the sideslip ($\beta$) and local velocity ratios UAA1 and UAA2 for the angle of attack ($\alpha$). In FIG. 6B, S-1, S-2, S-3, S-4 ... represent each respective sensor. The vehicle may have any number of sensors. The "X" in cells represent that there is no value for that cell. In FIG. 6B, a row is generated for the overall vehicle values such as free-stream velocity at infinity $V_\infty$, angle of attack ($\alpha$), and sideslip ($\beta$) which may be calculated by averaging the values in each respective column. For example, the overall free-stream velocity for the vehicle may be determined by averaging all of the local free-stream velocity at infinity $V_\infty$. Likewise, averaging the angle of attack angle of attack ($\alpha$) for each local sensor may provide the vehicle's angle of attack angle of attack ($\alpha$). Moreover, averaging the sideslip of each local sensor may provide the vehicle's sideslip ($\beta$). If only one angle of attack ($\alpha$) or sideslip ($\beta$) is calculated, averaging is not required.

Figure 7A:
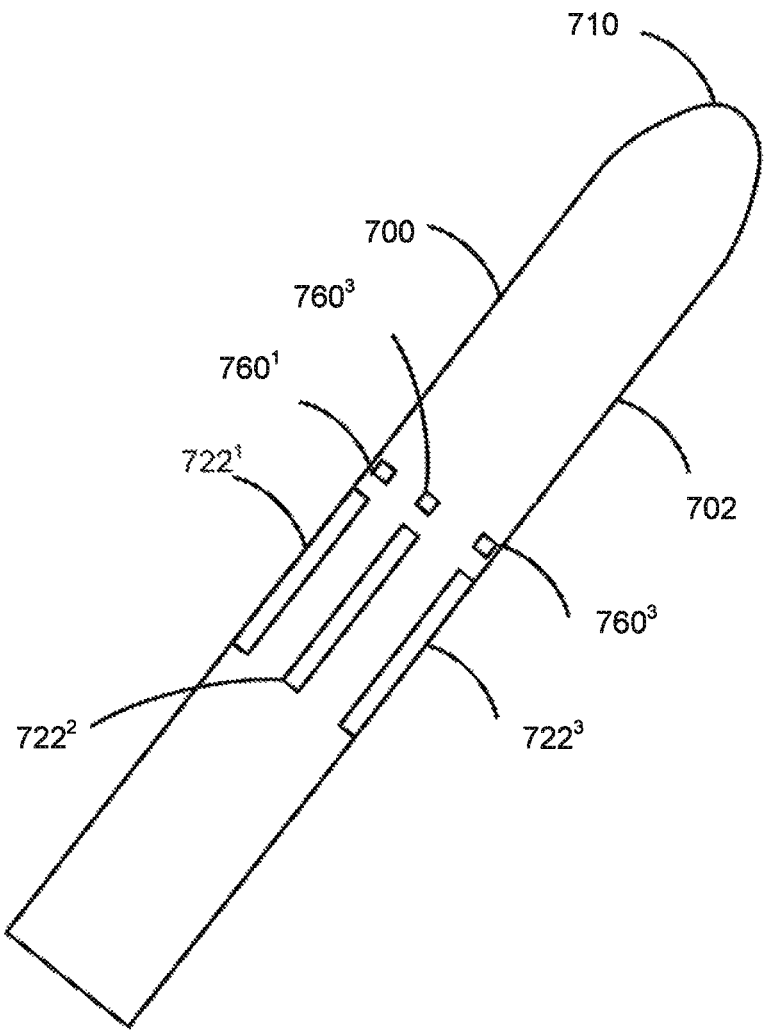
FIG. 7A illustrates the TAD system installed on a first vehicle body configuration.

FIG. 7A illustrates the TAD system installed on a first vehicle body configuration 700. The first vehicle body configuration 700 is shown as elongated and generally cylindrical or tubular with a rounded and tapering nose 710. In the embodiment, the plurality of pairwise TAD sensors (only heat dissipating plates $722^1$, $722^2$, $722^3$ and temperature sensors $760^1$, $760^2$, $760^3$ shown) are distributed circumferentially around the circumference of the vehicle body 722. The length of heat dissipating plates $722^1$, $722^2$, $722^3$ is parallel to the longitudinal axis of the vehicle body. In an embodiment, the plurality of sensors may be equidistant.

Figure 7B:
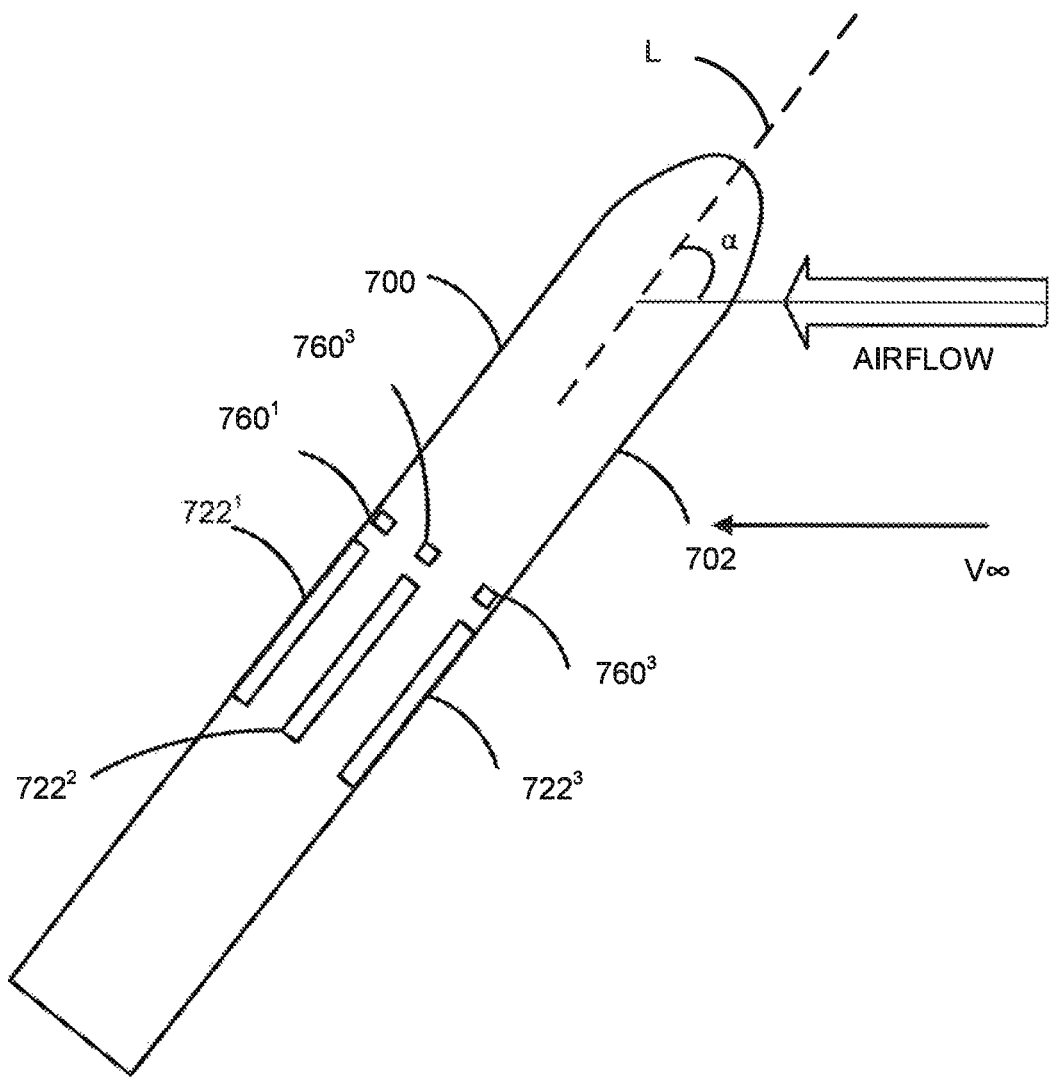
FIG. 7B illustrates the TAD system installed on a first vehicle body configuration and with the angle of attack ($\alpha$) shown in relation to the airflow.

FIG. 7B illustrates the TAD system installed on a first vehicle body configuration 700 and with the angle of attack ($\alpha$) shown in relation to the airflow. The dashed line L represents the longitudinal axis of the vehicle body 702.

Figure 8:
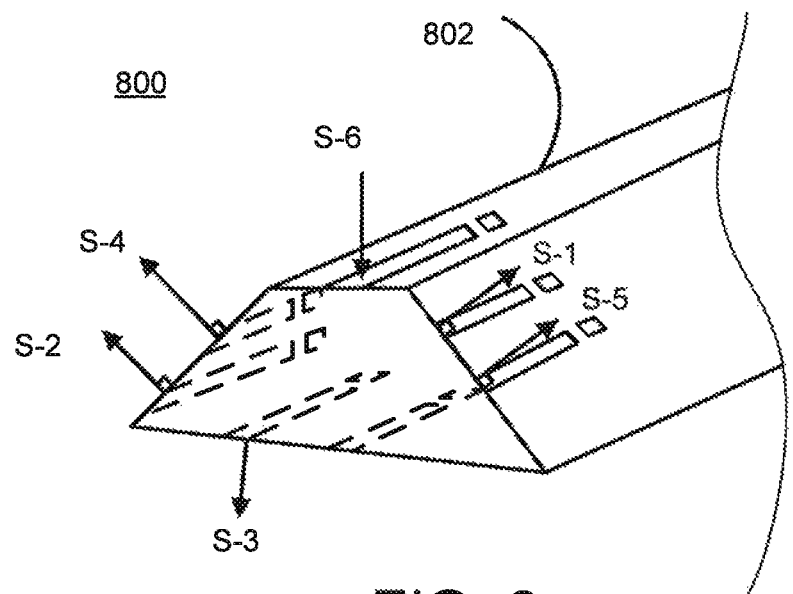
FIG. 8 illustrates the TAD system installed on a second vehicle body configuration.

FIG. 8 illustrates the TAD system installed on a second vehicle body configuration 800. The vehicle body configuration 800 has a vehicle body 802 with a geometrical shape that is non-circular. By way of non-limiting example, the cross-section has a trapezoidal shape. The plurality of sensors S-1, S-2, S-3, S-4, S-5 and S-6 are labeled. These sensors are TAD sensors and are arranged circumferentially around the vehicle body 802 such that each side includes at least one sensor having a heat dissipating plate parallel to the longitudinal axis of the vehicle body. The sensor arrangement may be used to calculate the sideslip (β) and angle of attack (α). In this example, sensors S-3 and S-5 may be used to calculate the angle of attack wherein sensors S-3 and S-5 have surface normal that are opposite in the pitch plane. The orientation is approximately 135 degrees. The orientation must be greater than 90 degrees up to 180 degrees.

The sideslip (β) would be calculated based on $V_{LS3}/V_{LS5}$ where $V_{LS3}$ is the local velocity $V_L$ of sensor S-3 and $V_{LS5}$ is the local velocity $V_L$ of sensor S-5. As can be appreciated, sensors S-3 and S-5 are the SS pairwise sensor combinations. Other SS pairwise sensor combinations are provided in the arrangement. For example, any sensor pair may be used which has at least 90 degrees between surface normals to the yaw plane of the vehicle body 802. For the purposes of illustration, USS1 is equal $V_{LS3}/V_{LS5}$ ((the sideslip (β)) for a single pair of sensors. USS2 would be for a different set of SS pairwise sensor combinations which has at least 90 degrees between surface normals.

The angle of attack (α) is calculated based on $V_{LA1}/V_{LA2}$, where $V_{LA1}$ is the local velocity $V_L$ of sensor S-1 and $V_{LA2}$ is $V_L$ of sensor S-2. The AA pairwise sensor combination may include sensors which are approximately 180° offset from each other. The AA pairwise sensor combination may be selected such that the surface normal is different (opposite) in the pitch plane of the vehicle body 802. In the illustration, sensor S-1 and sensor S-2 are at least 90 degrees offset and have a surface normal which is opposite that of the pitch plane.

The sensors may be attached on a variety of vehicle body surfaces that are generally fixed in flight. The sensors may be located on fixed wing surfaces, fixed tail surfaces, vehicle body, and other fixed vehicle fins. The sensors may be equidistant from each other around the circumference of the vehicle.

Figure 9:
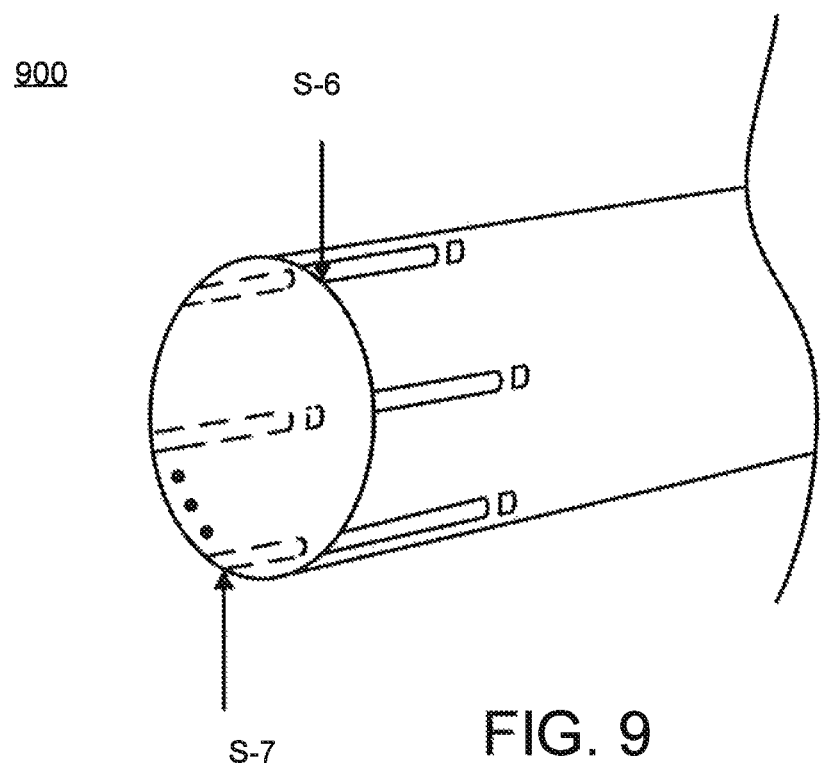
FIG. 9 illustrates the TAD system installed on a third vehicle body configuration.

FIG. 9 illustrates the TAD system installed on a third vehicle body configuration 900. This configuration has a generally circular body profile. For illustrative purposes sensors S-6 and S-7 may be used as AA pairwise sensor combinations as these sensors are approximately 180 degrees opposite each other.

Figure 10:
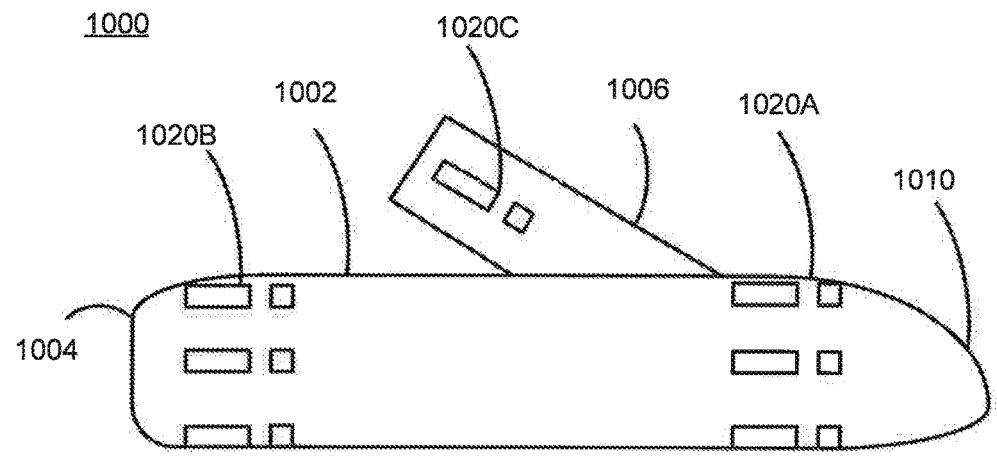
FIG. 10 illustrates the TAD system installed on a fourth vehicle body configuration.

FIG. 10 illustrates the TAD system installed on a fourth vehicle body configuration 1000. The fourth vehicle body configuration 1000 includes a rounded nose 1010, and elongated body 1002 with a tail end with a taper 1004. Additionally the vehicle body configuration 1000 includes wings 1006. The TAD system includes a set of sensors 1020A at a first location of the vehicle body configuration and a second set of sensors 1020B at a second location of the vehicle body. The location may correspond to transitions in the vehicle body. The system may be configured to calibrate the angle of attack, sideslip and free-stream velocity at infinity using both sets of sensors 1020A and 1020B.

The vehicle body configuration 1000 further includes a wing with at least one sensor on wing 1006. The wing may be used to calibrate the angle of attack, sideslip and free-stream velocity at infinity alone or in combination with the set of sensors 1020A and/or the set of sensors 1020B. A second wing is not shown. However, sensors on two wings may be used as SS pairwise sensor combinations for calculating the sideslip (β). The set of sensors surrounding the longitudinal axis of the elongated body 1002 would be used for the AA pairwise sensor combinations.

Figure 11:
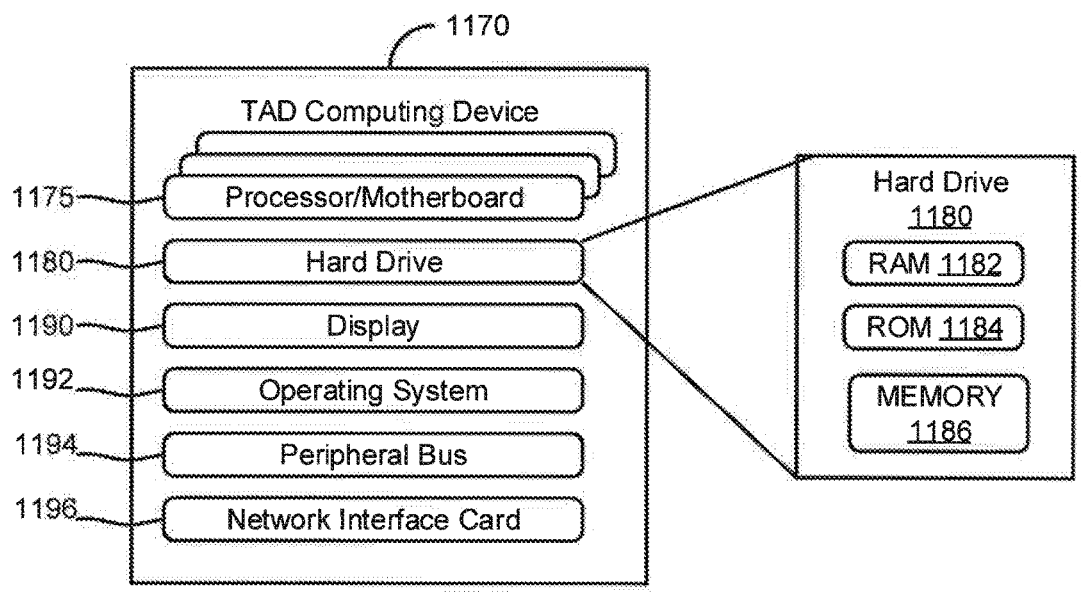
FIG. 11 illustrates the TAD computing device for the TAD system of FIG. 1.

Referring now to FIG. 11, in a basic configuration, the TAD computing device 1170 may include any type of stationary computing device or a mobile computing device. Computing device may include at least one processor 1175 and system memory in hard drive 1180. Depending on the exact configuration and type of computing device, system memory may be volatile (such as RAM 1182), non-volatile (such as read only memory (ROM 1184), flash memory 1186, and the like) or some combination of the two. System memory may store operating system 1192, one or more applications, and may include program data for performing process 500. The TAD computing device 1170 may carry out one or more steps of process 400. Computing device 1170 may also have additional features or functionality. For example, computing device 1170 may also include additional data storage devices (removable and/or non-removable) such as, for example, magnetic disks, optical disks, or tape. Computer storage media may include volatile and non-volatile, non-transitory, removable and non-removable media implemented in any method or technology for storage of data, such as computer readable instructions, data structures, program modules or other data. System memory, removable storage and non-removable storage are all examples of computer storage media. Computer storage media includes, but is not limited to, RAM, ROM, Electrically Erasable Read-Only Memory (EEPROM), flash memory or other memory technology, compact-disc-read-only memory (CD-ROM), digital versatile disks (DVD) or other optical storage, magnetic cassettes, magnetic tape, magnetic disk storage or other magnetic storage devices, or any other physical medium which can be used to store the desired data and which can be accessed by computing device. Any such computer storage media may be part of device.

Computing device 1170 may also include or have interfaces for input device(s) (not shown) such as a keyboard, mouse, pen, voice input device, touch input device, etc. The computing device 1170 may include or have interfaces for connection to output device(s) such as a display 1190, speakers, printer, etc. The computing device 1170 may include a peripheral bus for connecting to peripherals. Computing device 1170 may contain communication connection(s) that allow the device to communicate with other computing devices, such as over a network or a wireless network. By way of example, and not limitation, communication connection(s) may include wired media such as a wired network or direct-wired connection, and wireless media such as acoustic, radio frequency (RF), infrared and other wireless media. The computing device 1170 may include a network interface card 1196 to connect (wired or wireless) to a network.

Computer program code for carrying out operations of the invention described above may be written in a high-level programming language, such as C or C++, for development convenience. In addition, computer program code for carrying out operations of embodiments described herein may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed Digital Signal Processor (DSP) or microcontroller. A code in which a program of the embodiments is described can be included as a firmware in a RAM, a ROM and a flash memory. Otherwise, the code can be stored in a tangible computer-readable storage medium such as a magnetic tape, a flexible disc, a hard disc, a compact disc, a photo-magnetic disc, a digital versatile disc (DVD).

The embodiments may be configured for use in a computer or a data processing apparatus which includes a memory, such as a central processing unit (CPU), a RAM and a ROM as well as a storage medium such as a hard disc.

So as not to be redundant, the temperature controller 150 may also include one or more of at least one processor, hard drive with memory, display, operating system, peripheral bus, interfaces and network interface card such as described in relation to the TAD computing device 1170 to carry out one or more steps of process 400.

The "step-by-step process" for performing the claimed functions herein is a specific algorithm, and may be shown as a mathematical formula, in the text of the specification as prose, and/or in a flow chart. The instructions of the software program create a special purpose machine for carrying out the particular algorithm. Thus, in any means-plus-function claim herein in which the disclosed structure is a computer, or microprocessor, programmed to carry out an algorithm, the disclosed structure is not the general purpose computer, but rather the special purpose computer programmed to perform the disclosed algorithm.

A general purpose computer, or microprocessor, may be programmed to carry out the algorithm/steps of the present invention creating a new machine. The general purpose computer becomes a special purpose computer once it is programmed to perform particular functions pursuant to instructions from program software of the present invention. The instructions of the software program that carry out the algorithm/steps electrically change the general purpose computer by creating electrical paths within the device. These electrical paths create a special purpose machine for carrying out the particular algorithm/steps.

Unless otherwise defined, all terms (including technical and scientific terms) used herein have the same meaning as commonly understood by one of ordinary skill in the art to which embodiments of the invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In particular, unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such data storage, transmission or display devices.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order or importance, but rather the terms first, second, etc., are used to distinguish one element from another.

While various disclosed embodiments have been described above, it should be understood that they have been presented by way of example only, and not limitation. Numerous changes, omissions and/or additions to the subject matter disclosed herein can be made in accordance with the embodiments disclosed herein without departing from the spirit or scope of the embodiments. Also, equivalents may be substituted for elements thereof without departing from the spirit and scope of the embodiments. In addition, while a particular feature may have been disclosed with respect to only one of several implementations, such feature may be combined with one or more other features of the other implementations as may be desired and advantageous for any given or particular application. Furthermore, many modifications may be made to adapt a particular situation or material to the teachings of the embodiments without departing from the scope thereof.

Therefore, the breadth and scope of the subject matter provided herein should not be limited by any of the above explicitly described embodiments. Rather, the scope of the embodiments should be defined in accordance with the following claims and their equivalents.

I claim:

1. A thermal air data (TAD) sensor comprising:
   a heat dissipating plate including a first surface and a second surface, the heat dissipating plate having a temperature maintained at the constant temperature and configured to be located at a first location with the first surface flush with an exterior surface of a vehicle;
   a temperature controller configured to control the temperature of the heat dissipating plate to maintain the constant temperature during flight of the vehicle and configured to calculate a value of power to maintain the heat dissipating plate at the constant temperature; and
   an ambient air temperature sensor configured to be located at a second location flush with the exterior surface of the vehicle and being paired with the first location.

2. The TAD sensor of claim 1, further comprising:
   a heater coupled to the heat dissipating plate, the heater configured to heat the heat dissipating plate to the constant temperature during the flight of the vehicle; and
   a plate temperature sensor coupled to the heat dissipating plate wherein the temperature controller is coupled to the heater and the plate temperature sensor for controlling the temperature of the heat dissipating plate.

3. The TAD sensor of claim 2, wherein the heater is a resistive heater and being in surface to surface contact with the second surface of the heat dissipating plate.

4. The TAD sensor of claim 2, wherein the heat dissipating plate is made of a material having a thermal conductivity above 24 Btu/(hr. ° F. ft.).

5. The TAD sensor of claim 1, further comprising a coating on the heat dissipating plate, wherein the coating is made of a material with low observability (LO) properties.

6. The TAD sensor of claim 1, wherein the first surface is configured to reduce drag as air flows over the first surface.

7. The TAD sensor of claim 2, wherein the first surface comprises an area; and
further comprising a plurality of plate temperature sensors wherein an average temperature is determined for the area of the first surface.

8. The TAD sensor of claim 1, further comprising a look up table (LUT), the LUT includes columns for local air velocity of the vehicle correlated to a conjugate heat transfer coefficient as a function of one or more MACH numbers for the TAD sensor wherein the local air velocity is calculated at the TAD sensor during the flight of the vehicle.

9. The TAD sensor of claim 1, further comprising:
calculating, by the temperature controller, a local air velocity as a function of a pairwise difference in temperature between the first location and the second location and relies on dissipated heat at the first location transferred to ambient air during the flight of the vehicle.

10. The TAD sensor of claim 9, wherein the ambient air temperature sensor is configured to be mounted to the vehicle body at the second location wherein the first location is upstream the second location on the vehicle body.

11. A method comprising:
providing a thermal air data (TAD) sensor comprising a heat dissipating plate including a first surface and a second surface, the heat dissipating plate having a temperature maintained at a constant temperature and configured to be located at a first location with the first surface flush with an exterior surface of a vehicle, a temperature controller and an ambient air temperature sensor;
sensing ambient air temperature, by the ambient air temperature sensor, at a second location different from the first location and paired with the first location;
controlling, by the temperature controller, the temperature of the heat dissipating plate to the constant temperature; and
calculating, by the temperature controller, a value of power to maintain the heat dissipating plate at the constant temperature during flight of the vehicle.

12. The method of claim 11, further comprising:
heating, by a heater coupled to the heat dissipating plate, the heat dissipating plate to the constant temperature during the flight of the vehicle; and
sensing, by a plate temperature sensor coupled to the heat dissipating plate, a plate temperature wherein the temperature controller is coupled to the heater and the plate temperature sensor.

13. The method of claim 12, wherein the heater is a resistive heater and being in surface to surface contact with the second surface of the heat dissipating plate.

14. The method of claim 11, wherein the providing of the heat dissipating plate comprises providing the heat dissipating plate made of a material having a thermal conductivity above 24 Btu/(hr. ° F. ft.).

15. The method of claim 11, wherein the providing of the heat dissipating plate includes providing the heat dissipating plate with a coating made of a material with low observability (LO) properties.

16. The method of claim 11, wherein the first surface is configured to reduce drag as air flows over the first surface; and
further comprising reducing drag as the air flows over the first surface.

17. The method of claim 11, further comprising providing a look up table (LUT), the LUT includes columns for local velocity of the vehicle correlated to a conjugate heat transfer coefficient as a function of one or more MACH numbers for the TAD sensor wherein the local velocity is calculated at the TAD sensor during the flight of the vehicle.

18. The method of claim 11, further comprising:
calculating, by the temperature controller, a local air velocity as a function of a pairwise difference in temperature between the first location and the second location and relies on dissipated heat at the first location transferred to ambient air during the flight of the vehicle.

19. The method of claim 18, wherein the ambient air temperature sensor is configured to be mounted to the vehicle body at the second location wherein the first location is upstream the second location on the vehicle body.

* * * * *